United States Patent

[11] 3,557,963

| [72] | Inventor | Robert J. Offer |
| | | Racine, Wis. |
| [21] | Appl. No. | 566,781 |
| [22] | Filed | July 21, 1966 |
| [45] | Patented | Jan. 26, 1971 |
| [73] | Assignee | Tenneco Inc. |
| | | Houston, Tex. |
| | | a corporation of Delaware, by mesne assignments |

[54] SEAL FOR THROWAWAY FILTER
7 Claims, 3 Drawing Figs.

[52] U.S. Cl. .................................................. 210/443, 210/450
[51] Int. Cl. .................................................. B01d 35/02, B01d 27/08
[50] Field of Search .......................................... 210/232, 462, 450, 443, 440, (T.O. Digest); 277/177

[56] References Cited
UNITED STATES PATENTS

| 2,360,731 | 10/1944 | Smith | 277/177 |
| 2,760,642 | 8/1956 | Wallace | 210/450X |
| 3,076,551 | 2/1963 | Humbert, Jr. | 210/440X |
| 3,146,194 | 8/1964 | Hathaway | 210/130 |
| 3,204,771 | 9/1965 | Baldwin | 210/443 |
| 3,265,213 | 8/1966 | Decker et al. | 210/136 |
| 3,272,342 | 9/1966 | McLaren et al. | 210/440 |
| 3,337,056 | 8/1967 | Stripp | 210/440 |

*Primary Examiner*—Frank A. Spear, Jr.
*Attorney*—Harness, Dickey and Pierce

ABSTRACT: A throwaway filter for attachment by motion parallel to its axis to a flat base extending at right angles to its axis has an annular gasket coaxial with the filter axis that is compressed against the flat base by axial movement and has a tapered projecting portion that engages the seating surface with an initial circular line contact.

PATENTED JAN 26 1971

3,557,963

INVENTOR.
Robert J. Offer
BY
Carnes, Dickey & Pierce
ATTORNEYS.

SEAL FOR THROWAWAY FILTER

This invention relates to disposable or throwaway filters of the type used in motor vehicle internal combustion engines and, in particular, refers to a seal means for preventing leakage of oil when the filter is attached to the filter base on the engine.

It is the object of this invention to provide an improved seal for use in a throwaway filter which will be extremely effective to prevent leakage of fluid and which at the same time makes it easier to attach and remove the throwaway filter from the filter base.

The invention provides a controlled compression gasket by means of a special shape which results in the rubber being used very efficiently during sealing and at the same time permits the gasket to be stack molded, thus making it capable of manufacture at a minimum cost.

Other features and objects of the invention will become apparent upon consideration of the accompanying drawings, in which.

Figures 1, 2, 3:
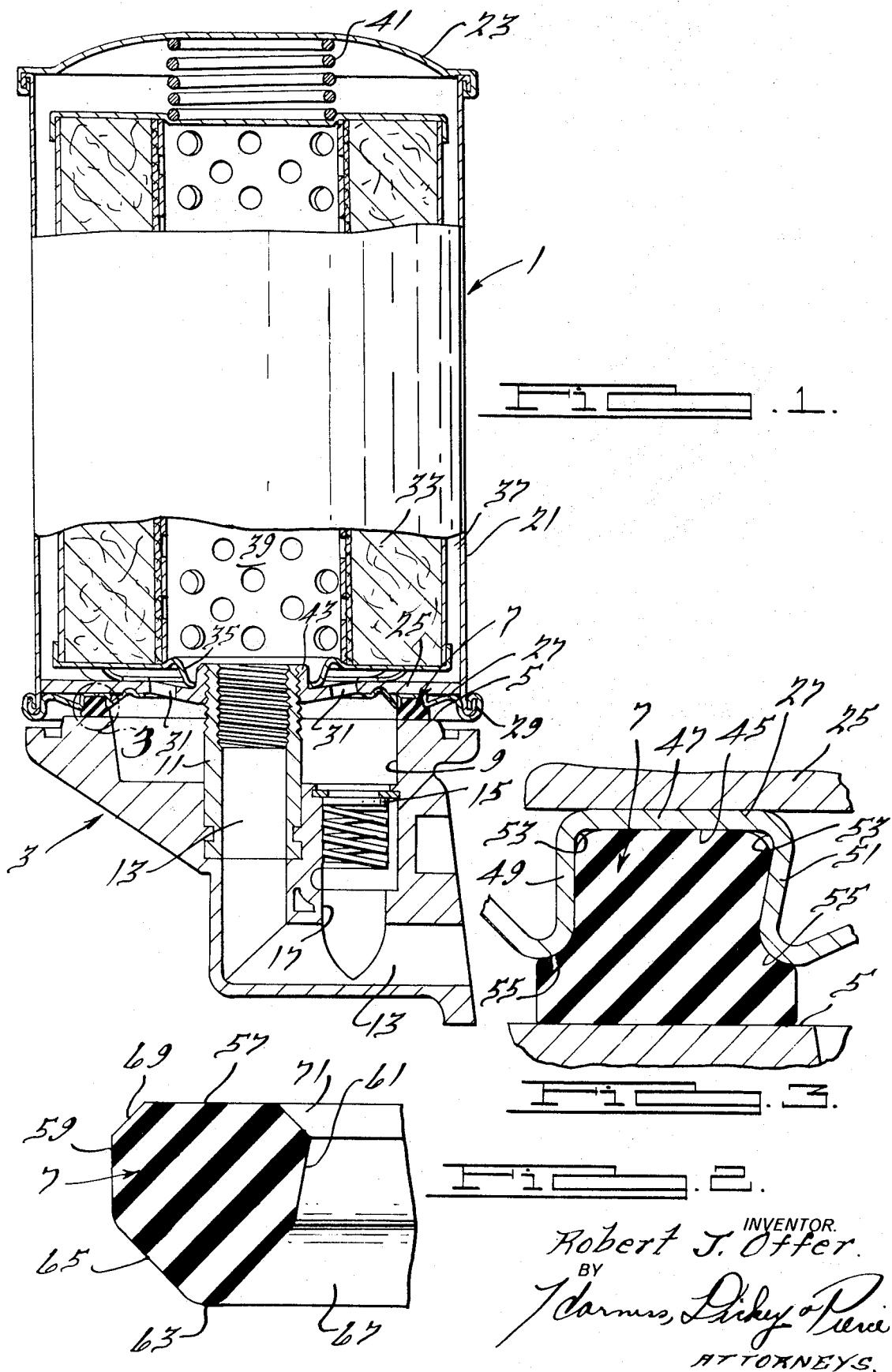
FIG. 1 is a side elevation, mostly in section, of a throwaway filter attached to a filter base.
FIG. 2 is a detail view of the gasket embodying the invention.
FIG. 3 is a sectional view on an enlarged scale showing the gasket attached to the mounting and compressed against a sealing surface of the filter base.

As seen in FIG. 1, the throwaway filter 1 is mounted on a filter base 3 which is connected to or a part of an internal combustion engine that is to be lubricated. The base has a flat surface 5 which forms a sealing surface on which the throwaway filter 1 is mounted, the seal being effected by the seal member 7 which is carried by the cartridge 1.

The base 3 has a central recess 9 and a suitable oil passage (not shown) supplies oil to be filtered to the recess 9. After the oil has been filtered it enters a tube 11 in the filter base which has a part of passage outlet 13 that forms the conduit for filtered oil and leads it to the bearings or other desired points within the engine. A relief valve structure blocks the passage 17, which leads from the chamber 9 to the outlet passage 13 until such time as resistance and flow through the oil filter exceeds the setting of the valve 15 when it will open and permit bypassing directly from the chamber 9 to the outlet passage 13.

The filter 1 includes a housing 21 that is closed at one end by a wall 23 and at the other end by a relatively thick reinforcing plate 25, as well as by a thinner gasket support plate 27 which is connected in an interlock joint or seam 29 with the end of the shell 21. The reinforcing plate 25 has openings 31 formed in it which will permit oil to flow to the inside of the filter 1 from the inlet chamber 9. Mounted within the shell 1 is a filter element 33 which is spaced above the reinforcing plate 25 by suitable means such as the support structure 35. Thus, oil which enters the filter 1 through the inlet openings 31 can flow radially outwardly to the space 37 between the filter element 33 and the housing 21, and then flow radially inwardly to be filtered as it passes the filter element 33 to flow into the perforated center tube 39. Oil in the center tube 39 flows into outlet passage 13 and back to the engine. The filter element 33 is held on the reinforcing plate 25 by the coil spring 41 acting against the wall 23 of the filter element.

It will be seen that the oil in the chamber 9 is under pressure and will attempt to leak out of the chamber along the joint formed between the sealing element 7 and the face 5 of the filter base 3. The seal 7 is held under compression against the face 5 by the means of the threaded connection between the neck 43 in the reinforcing plate 25 and the tube 11 of the filter base. This threaded connection provides the means whereby the filter 1 is screwed in place and then unscrewed when it is desired to replace it.

The end plate 27 is provided with a socket or recess 45 for holding the gasket 7. It comprises a base or bottom wall 47, a sidewall 49, and another sidewall 51. At the time of initial formation the sidewall 51 is preferably parallel to the sidewall 49, contrary to the showing in FIG. 3. However, after the gasket 7 has been installed in the annular recess 45, the sidewall 51 is crimped or bent to an approximately 10° angle as shown so that it provides a dovetail means to hold the gasket 7 in the recess 45 and prevent it from falling out. It will be noted that the corners between the base wall 47 and the sidewalls 49 and 51 of the annular socket 45, are provided with radii 53 and 51 and that the open side of the recess 45 is defined radiused or curved shoulders 55 at the ends of walls 49 and 51.

The gasket element 7 is ring-shaped and specially designed to fit in the opening 45 with a minimum nonsealing or nonessential flow of rubber when the filter 1 is screwed in place on the filter base tube 11. The overall width and length of the gasket 7 in cross section are preferably the same, that is, the gasket is basically a square in cross section. As seen in FIG. 2, the gasket 7 has a face 57 for engagement with the wall 47 of the recess; a sidewall 59 for engagement with the sidewall 49 of the recess; and a tapered sidewall 61, formed on about a 10° angle, that engages the sidewall 51 of the recess 45. In a typical design, the inside overall width of the recess 45 was 0.1975 inches and the overall width of the gasket 7 was 0.1750, so that the recess was approximately 0.025 inch larger in width than the seal 7 in the free state. The depth of the recess 45 from the outside of the corners 55 to the face of the bottom wall 47 was 0.107 inch.

The bandlike sealing end of the gasket 7 is preferably formed on a small radius, as indicated at 63. This radius is connected to small radii at the ends of the faces 59 and 61 by inclined faces 65 and 67 respectively, which are preferably formed on 45° angles. Thus, the faces 59 and 61 terminate at approximately the midplane of the sealing member 7. As shown, the corners between the face 57 and the side faces 59 and 61 are preferably relieved or removed on a 45° angle as indicated at 69 and 71 though these corners may be formed on a radius if desired to provide clearance of the socket corners 53 and eliminate compression of the gasket in assembly. Preferably, the removed material is somewhat larger than the corresponding corners 53 in the groove 45.

The line contact surface 63 of seal 7 is the first to engage the flat surface 5 when the filter 1 is screwed into place and since there will be a high concentration of force on it a very effective seal will be obtained. As continued force is applied, the projecting section of the seal will deform so that eventually it will reach substantially the shape indicated in FIG. 3. As compared with the normally used gasket which has a flat face rather than a pointed surface 63 to engage the sealing surface 5, it will be seen that much less rubber material must be deformed and accordingly, considerably less force is needed to screw the filter home on the base. Furthermore, it is easier to release the filter 1 when it is desired to remove and replace it.

The structure of this seal 7 is such that it can be molded from a smooth, high density material and in fact it can be molded in stacks thereby reducing the unit cost of the seal. The shape is such that the rubber is not distorted or compressed when it is crimped in place by deformation of the side 51 of the socket 45, i.e., it is held by a dovetail type of connection. The gasket seats squarely in the bottom of the groove and these various overall features give a controlled compression seal which is highly effective and efficient in preventing leakage of oil out of the chamber 9.

Modifications may be made in the specific structure illustrated without departing from the spirit and scope of the invention.

I claim:

1. A liquid filter for removable attachment to a filter base that has a flat filter seating surface normal to the filter axis said filter comprising a cylindrical filter housing containing a filter element and having a transverse wall means at one end provided with liquid inlet and outlet ports, said wall means including an annular gasket receiving socket of substantially rectangular cross section located outwardly of said ports, an annular elastically deformable gasket seated in said socket and adapted to be elastically compressed and deformed against said seating surface by a compressive force acting along the axis of the gasket when said filter is attached to said base, said gasket having an annular base portion of substantially rectangular cross section seated in said socket and an annular projecting portion extending from said base portion and projecting out of said socket, said projecting portion having inner and outer annular sidewalls which converge together to form a narrow annular substantially line contact surface lying in one plane substantially parallel to said transverse wall means to initially engage said flat seating surface when said filter is attached to said base, said gasket seating squarely on the bottom of the socket and having a dovetail mechanical connection with the socket to hold it in the socket, said gasket being undeformed in the socket prior to compression against said seating surface.

2. A liquid filter for removable attachment to a filter base that has a flat seating surface, said filter comprising a cylindrical filter housing containing a filter element and having a transverse wall means at one end provided with liquid inlet and outlet ports and lying parallel to said seating surface when said filter is attached to said base, said wall means including an annular gasket receiving and locating socket of rectangular cross section positioned outwardly of said ports, an annular elastically deformable gasket seated in said socket and adapted to be elastically compressed and deformed against said seating surface when said filter is attached to said base, said gasket being coaxial with said housing and said filter being attached to said base and said gasket compressed against said surface by an attaching force coaxial with said housing, said gasket having an annular base portion of substantially rectangular cross section in said socket and an annular projecting portion extending from said base portion, said projecting portion having flat inner and outer annular sidewalls which converge together to form a narrow annular substantially line contact surface lying in one plane to initially engage said flat seating surface when said filter is attached to said base.

3. A liquid filter for removable attachment to a filter base that has a flat filter seating surface, said filter comprising a cylindrical filter housing containing a filter element and having a transverse wall means at one end provided with liquid inlet and outlet ports, said wall means including an annular gasket receiving socket of substantially rectangular cross section located outwardly of said ports, an annular elastically deformable gasket seated in said socket and adapted to be elastically compressed and deformed against said seating surface by a compressive force acting along the axis of the gasket when said filter is attached to said base, said gasket having an annular base portion of substantially rectangular cross section seated in said socket and an annular projecting portion extending from said base portion and projecting out of said socket, said projecting portion having inner and outer annular sidewalls which converge together to form a narrow annular substantially line contact surface lying in one plane substantially parallel to said transverse wall means to initially engage said flat seating surface when said filter is attached to said base, said gasket seating squarely on the bottom of the socket and having a dovetail mechanical connection with the socket to hold it in the socket, said gasket being undeformed in the socket prior to compression against said seating surface, the corners of said gasket being relieved to provide clearance with respect to the inside corners of said socket.

4. A filter as claimed in claim 3 wherein said wall means has curved shoulders defining the outer edges of the socket.

5. A filter as claimed in claim 4 wherein the overall width of a cross section of said gasket is substantially the same as the combined height of said base and projecting portions.

6. A filter as claimed in claim 5 wherein said line contact surface of the gasket is formed on a small radius.

7. A liquid filter for removable attachment to a filter base that has a flat seating surface normal to the axis of the filter, said filter comprising a cylindrical filter housing containing a filter element and having a transverse wall means at one end provided with liquid inlet and outlet ports and lying parallel to said seating surface when said filter is attached to said base, said wall means including an annular gasket receiving and locating socket of substantially rectangular cross section positioned outwardly of said ports, an annular elastically deformable gasket seated in said socket and adapted to be elastically compressed and deformed against said flat seating surface when said filter is attached to said base, said gasket being coaxial with said housing and said filter being attached to said base and said gasket compressed against said surface by an attaching force coaxial with said housing, said gasket having an annular base portion of substantially rectangular cross section in said socket and an annular tapering projecting portion extending outside said socket, said tapering projecting portion forming a narrow annular substantially line contact surface lying in a plane normal to the filter axis to initially engage said flat seating surface when said filter is attached to said base, the corners of said gasket being relieved to provide clearance with respect to the inside corners of the socket.